Patented Oct. 8, 1946

2,409,134

UNITED STATES PATENT OFFICE 2,409,134

DERIVATIVES OF 6-AMINO-1,3-BENZO-DIOXAN

Hans Z. Lecher, Plainfield, John P. Goulding, Neshanic Station, and Robert P. Parker, Somerville, N. J., assignors to American Cyanamid Company, New York, N. Y., a corporation of Maine No Drawing. Application December 10, 1943,
Serial No. 513,733

5 Claims. (Cl. 260—338)

This invention relates to a new series of chemical compounds comprising organic derivatives of 6-amino-1,3-benzodioxan represented by the following formula:

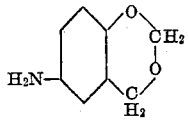

useful as intermediates in the production of dyestuffs. The invention also contemplates dyestuffs produced therefrom.

More particularly, the present invention relates to N-substituted derivatives of the aminobenzodioxan, the N-substituent being a p-aminophenyl radical represented and numbered for purposes of the present invention as

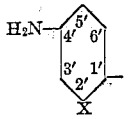

in which X may represent a hydrogen, halogen, nitro, carboxy or sulfonic radical, the acyl radical of a carboxylic acid, or a sulfonamide group.

The instant application relates to the new organic bases per se. Azo dyes, particularly ice-colors, having novel color shades and unusual light fastness may be derived therefrom. These new dyestuffs comprise the subject matter of our copending application for United States Letters Patent, Serial No. 513,736, filed of even date.

Very few aromatic amino compounds have been known which produce on diazotization and coupling with an ice-color coupling component strong blue to violet shades. It is one of the principal objects of the present invention to produce a new series of bases and ice-colors derived therefrom which will have these desirable shades. It is a further object of the invention to produce a series of bases suitable for the production of other azo dyes and to develop such dyes therefrom.

In general, the principal objects of the present invention are accomplished by condensing the amino-1,3-benzodioxan with a para-nitrohalogenobenzene and subsequently reducing the nitro group to an amino group. The resulting new compounds, after diazotization and coupling, yield dyestuffs which have the desired properties.

Either para-nitrohalogenobenzene or a para-nitrohalogenobenzene containing a negative substituent ortho to the halogen radical may be used as a starting material. These negative substituents may be radicals such as halogen, nitro, carboxy, or sulfonic radicals, the acyl radical of a carboxylic acid or a sulfonamide group. In any case, after condensation and reduction the product constitutes an N-para-aminophenyl-substituted aminobenzodioxan. Therefore, as used in the instant application, the expression "a para-aminophenyl radical" includes not only the para-aminophenyl radical, but also those 2'-substituted-4'-amino-phenyl groups in which the negative substituents are present.

Similarly, for the purposes of the present invention, the expression "a sulfonamide radical" is used to designate not only the

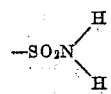

group, but also N-substituted-sulfonamides. In the latter case, the sulfonamide group may be one in which either or both of the hydrogens are substituted by an alkyl or aryl radical or one in which the substituents form with the nitrogen a heterocyclic ring such as a sulfonpiperidide, sulfonmorpholide or the like.

Those para-nitrohalogenobenzenes containing negative substituents, ortho to the halogen radical, are particularly useful. When such materials are used, condensation proceeds smoothly in aqueous media. The invention, however, is not necessarily so limited. Condensation may be carried out in any solvent compatible with the solubility and reactivity of the particular nitrohalogenobenzene employed. In some cases, an anhydrous solvent such as nitrobenzene or the like is required. In some cases, also, the use of a cupriferous catalyst may be of advantage. Generally, too, it is well to provide an acid binder such as a metal oxide, carbonate or the like.

Reduction of the nitro to an amino group may be carried out either by alkaline or by acidic reducing agents. The pH will determine whether free bases or salts will be produced. It will be apparent that two different types of salts are possible. There may be acid salts of the base. On the other hand, when an acidic substituent such as a carboxylic or sulfonic group is present on the p-aminophenyl radical, the acidic constituent may be neutralized to form a salt. Both types of salts as well as the free bases are useful. Each may be converted to the others by appropriate treatment. References to the new bases in the instant specification and claims are therefore intended to include not only the bases themselves but also both types of salts thereof.

Diazotization of some bases of the present invention in mineral acid solution by nitrous acid produces, according to the conditions imposed, two different products. In general, use of higher temperatures, greater concentration of the base in solution, higher mineral acid concentration and excess nitrous acid generally lead to formation of an N-nitroso derivative of the diazonium salts. Lower temperature, lower acid concentrations and controlled nitrous acid addition lead to formation of the diazonium chloride itself.

In general, the N-nitroso diazotization products lead to the production of different, duller and less desirable shades when coupled. The simple diazotized product leads to the production of the more valuable and faster shades. Conversion of the N-nitroso colors to the more desirable shades is accomplished through hydrolysis of the former. This may be accomplished by heating the N-nitroso derivatives in dilute solutions of some alkaline material such as soda ash or the like. Reducing agents such as sodium sulfide, sodium bisulfite or their equivalents may be included in the saponification bath to destroy nitric oxides as they are liberated.

In their diazotized form, the bases may be coupled either with or without a substrate, to yield dyestuffs or pigments of great value because of their strength, variety of shade and fastness properties. In particular, however, the bases of the present invention are important for the production of fast blue prints or dyeings upon cellulosic materials. These are produced in general, by impregnating the cellulosic material in alkaline baths with appropriate ice-color coupling components and then printing solutions of the diazotized bases which have been buffered and thickened upon such prepared cloth, or by pad dyeing the prepared cloth in buffered solutions of the diazotized bases or the diazo salts.

The bases of the present invention may be also converted into diazo-sulfonates. If the basic portion of these diazo-sulfonates is free from solubilizing groups, they may be blended with appropriate ice-color coupling components and oxidizing agents. Such blends may be incorporated into a printing paste, printed on vegetable fibers and the pigment developed by treatment with steam.

Substantially any of the ice-color coupling components are generally useful for production of insoluble, developed dyes, and enable the production of a variety of colors from yellow to blue. However, for the present purposes, the use of arylides of 2-hydroxy-3-naphthoic acid is preferable. These produce, when coupled with the diazotized bases of the present invention, the most desirable blue to violet shades.

However, the invention is not necessarily so limited. Among other ice-color coupling components which produce useful products may be listed by way of example such compounds as beta-naphthol, 8-amino-2-naphthol, 8-acetylamino-2-naphthol, benzoyl naphthols; pyrazolones and pyrazyl pyrazolones; hydroxy benzofluorenones; hydroxy derivatives of phenyl naphthylamines such as 7-hydroxy-1-naphthyl-m-hydroxyphenylamine; particularly the various N-substituted amides such as arylides, of 5,6,7,8-tetrahydro-2-hydroxy-3-naphthoic acid, of 2-hydroxy-3-anthroic acid, of methyl and dimethyl salicyclic acids, of hydroxy carbazole carboxylic acids, of hydroxy benzocarbazole carboxylic acids, of hydroxy-benzoacridone carboxylic acids, of 3,7-dihydroxy-naphthalene-2,6-dicarboxylic acid, of hydroxy-dibenzofuran carboxylic acids, of hydroxy benzothiophene carboxylic acids, etc., and the arylides of acetoacetic acid, furoyl acetic acid, benzoyl acetic acid, terphthabyl-bis-acetic acid and the like. The arylide group in the coupling component may be a simple aromatic group such as the radical of aniline or of an aniline derivative or of a naphthylamine, or it may be the radical of a heterocyclic amine, such as, e. g., of an amine of the benzothiazole series or of a diamine of the diphenylene oxide or diphenylene sulfone series.

The bases of the present invention also may be used in the preparation of water-soluble dyestuffs suitable for dyeing vegetable or animal fibers. In this case, a great many of the customary phenolic or aminic coupling components may be used. The coupling component, however, must carry at least one sulfonic group in case the diazo component has none. Illustrative examples of such coupling components include salicyclic acid, resorcinol, m-phenylene diamine, the large number of naphthol-sulfonic acids such as e. g., R acid, G acid, the Cleve's acids, J acid, gamma acid, J-acid urea and J-acid imide, H acid and many others. Pyrazolones such as sulfonic derivatives of 1-phenyl-3-methyl pyrazolone-5 also may be used.

If so desired, the new diazo components of the present invention also may be used for the production of dis- and poly-azo dyes in accordance with the customary procedures. Depending upon their structure, the dyes obtained from the new bases are direct dyes, acid wool dyes or chrome dyes. In each group, a great many of them have very valuable dyeing and fastness properties.

The invention will be more fully illustrated in conjunction with the following examples which are meant to be illustrative only and not by way of limitation. All parts are by weight unless otherwise noted.

*Example 1*

63 parts of 2-chloro-5-nitrobenzene sulfondiethylamide are refluxed for 24 hours with 27.9 parts of 6-amino-1,3-benzodioxan in 200 parts of water containing 11 parts of calcium carbonate. On cooling, the precipitated material is separated by filtration and the residue extracted with hot alcohol. Upon cooling the alcohol extract, yellow crystals of N-(2'-sulfondiethylamide-4'-nitro-phenyl)-6-amino-1,3-benzodioxan, melting at 120°-121° C. are obtained. On recrystallizing from alcohol, the product melts at 124°-125° C.

*Example 2*

20.4 parts of the nitro compound of Example 1 are reduced at reflux temperature in a solution containing 36 parts of sodium sulfide dissolved in a mixture of 120 parts of alcohol and 50 parts of water. After 3 hours, the yellowish reaction mixture is poured on ice and the white precipitated material is collected by filtration. The product N-(2'-sulfondiethylamide-4'-amino-phenyl)-6-amino-1,3-benzodioxan melts at 101.5°-102.5° C. and has the following structure:

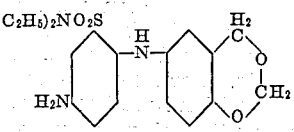

*Example 3*

1 part of the amine produced in Example 2 is treated with a solution of 1.65 parts of 31.5% hydrochloric acid in 13.65 parts of water at a temperature of 20° C. and then diazotized by the addition of 0.19 parts of sodium nitrite in 5 parts of water. After stirring for 10 minutes, 60 parts of water is added and stirring is continued until solution of the diazonium chloride is complete. This solution is then buffered with 20% sodium acetate solution to a basic test on Congo red paper and then diluted to 100 parts with water. The resultant solution is employed at room temperature to pad dye cotton cloth, previously impregnated with an alkaline solution of the anilide of 2-hydroxy-3-naphthoic acid. The dyed sample is rinsed in a dilute soda ash solution at 35° C., treated in a boiling 2% soda ash bath and finally soaped at elevated temperature. The cloth is dyed an even violet of good strength.

*Example 4*

7.54 parts of the amine as produced in Example 2 are dissolved in 20 parts of acetone and this solution is rapidly added to a solution of 60 parts of zinc chloride dissolved in 60 parts of water at a temperature of 30° C. At this point, 1.52 parts of sodium nitrite dissolved in 10 parts of water are slowly added. The precipitated material is filtered, the residue is extracted twice with warm water, the extracts are combined with the first filtrate and the zinc chloride double salt of the diazonium chloride is separated by saturating the solution with salt. Three parts of this dried zinc chloride double salt are intimately mixed with 1.2 parts of magnesium sulfate dihydrate. 2.5 parts of this salt mix are dissolved in 26.5 parts of water containing 0.5 part of sodium acetate and 0.5 part of 50% acetic acid solution. Seventy parts of a carbohydrate thickener are added and the color paste is printed on cotton cloth previously impregnated in an alkaline bath containing the alpha-naphthylamide of 2-hydroxy-3-naphthoic acid. The printed fabric is dried, rinsed in a dilute soda ash bath at 60° C. and soaped at the boil. The pattern is printed a strong violet to purple shade.

*Example 5*

11.3 parts of the amine produced as in Example 2 are treated in a solution of 32.6 parts of 17% hydrochloric acid and 30 parts of water with 2.1 parts of sodium nitrite dissolved in 50 parts of water. Some solid material is filtered off, the residue being washed with water. The filtrate is carefully neutralized with sodium carbonate until the solution is just basic to Congo red test paper after which sodium chloride is added and the precipitated, yellow diazonium chloride collected by filtration. Four parts of the dried diazonium chloride are dissolved in 250 parts of water and 2 parts of neutral sodium sulfite in 16 parts of water are added. To the clear solution is added sodium chloride and the sodium diazo sulfonate which precipitates is collected by filtration. 2.95 parts of this dried sodium diazo sulfonate are intimately mixed with 1.58 parts of the anilide of 2-hydroxy-3-naphthoic acid. 2.5 parts of this dry color mix are dissolved in 26.5 parts of water containing 0.5 part of sodium chromate and 70 parts of suitable carbohydrate thickener are added. The color paste is printed on boiled-out cotton cloth, the printed stripe dried and the color developed by steaming. The print is rinsed, treated in 2% soda ash solution at 60° C., and finally soaped at the boil. The pattern is dyed a violet shade.

*Example 6*

A number of other amides were substituted for the sulfondiethylamide of Example 2 and the procedures of Examples 4 and 5 are repeated. New color formulations are obtained having unusual color value and good general properties. Illustrative results are set forth in the following table:

| Substituted sulfonamide | Melting point nitro compound °C. | Melting point amino compound °C. | Arylide of 2-hydroxy-3-naphthoic acid | Color of dyeing |
|---|---|---|---|---|
| Amide | 199–200 | 194–195 | Anilide | Blue-red shade. |
| Morpholide | 181–182 | 182–183 | do | Strong violet. |
| Diethanolamide | 156–157 | Oil | do | Deep purple. |
| Anilide | 177–178 | 141–142 | do | Do. |
| o-Anisidide | 151–152 | 158–160 | α-naphthylamide | Violet purple. |

*Example 7*

25 parts of 2-chloro-5-nitrobenzophenone are condensed at reflux temperature with 15 parts of 6-amino-1,3-benzodioxan in a mixture of 75 parts of water and 20 parts of alcohol in the presence of 5.5 parts of calcium carbonate. The reaction mixture is then cooled, the reaction product settled out and the supernatant liquid decanted. After extraction with dilute hydrochloric acid and alcohol, a yellow, crystalline residue of N-(2'-benzoyl-4'-nitrophenyl)-6-amino-1,3-benzodioxan is obtained which on recrystallization from alcohol melts at 142°–143° C.

*Example 8*

7 parts of the nitro compound of Example 7 is slowly added to a boiling mixture of 10 parts of aqueous sodium sulfhydrate (30%) and 20 parts of alcohol. When reduction is complete, 100 parts of water are added and the precipitated material removed by filtration. On slurrying with dilute hydrochloric acid, the free base is converted to a hydrochloride which is collected by filtration. When the hydrochloride is neutralized, the free base is obtained. It melts at 163°–164° C. and has the following formula:

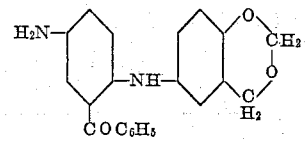

*Example 9*

0.3 part of the amine as prepared in Example 8 are stirred in 10 parts of water, treated with 1.1 parts of 5 normal hydrochloric acid and diazotized by addition of 0.084 part of sodium nitrite dissolved in 5 parts of water. On completion of diazotization, 30 parts of water are added and the solution is clarified. 25 parts of the diazo solution so obtained are treated with 10% sodium acetate solution to a negative acid test against Congo red paper and then with 5% sodium bicarbonate solution to a neutral test to litmus paper. Water is added to a total of 100 parts and cotton cloth, previously impregnated in alkaline solution of the anilide of 2-hydroxy-3-naphthoic acid, is padded in this bath. The resulting dyeing is rinsed, heated at the boil in 5% soda ash solution and soaped at elevated temperature. A deep purple dyeing results.

*Example 10*

To 580 parts of water are added 110 parts of sodium 2-chloro-5-nitrobenzene sulfonate (95%), 55 parts of calcium carbonate and 58.0 parts of 6-amino-1,3-benzodioxan. Under a nitrogen atmosphere the reaction mixture is stirred at reflux temperature for 24 hours and then 48.0 parts of potassium carbonate are added. After filtration at the elevated temperature, 83 parts of potassium chloride are strewn in portionwise and the temperature is lowered to 20° C. The light orange precipitate of the potassium salt of N-(2'- sulfo - 4'- nitro - phenyl) - 6 - amino - 1,3-benzodioxan is filtered off and washed with ice water on the filter to remove residual potassium chloride.

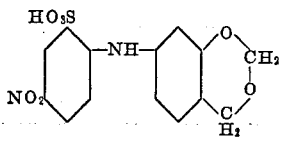

*Example 11*

35.0 parts of the salt obtained in Example 10 are slurried in 81 parts of water at 50° C. While agitating efficiently, 81 parts of sodium sulfhydrate solution (38% aqueous solution) are run in during one-half hour. After heating the resultant clear red solution for about ¼ hour at 50° C., and three hours at 65° C., the solution is treated with 30.0 parts of potassium chloride. The temperature of the resulting slurry is lowered to 5° C. and the precipitated product separated by filtration and washed on the filter with a little cold 20% potassium chloride. The residue is slurried in 250 parts of water and hydrochloric acid (1.19) is added until the solution shows an acid reaction to Congo red paper. After stirring for ½ hour, soda ash is added until the solution is basic to brilliant yellow paper, charcoal is added and the undissolved material is filtered off. Acidification of the filtrate, with hydrochloric acid, produces a white precipitate which is filtered off, washed with ice water and dried at 45° C. The product, N-(2'- sulfo-4'-amino - phenyl) - 6 - amino - 1,3-benzodioxan, is a white solid readily soluble in alkaline solution.

*Example 12*

1.6 parts of N-(2'-sulfo-4'-amino-phenyl)-6-amino-1,3-benzodioxan produced according to Example 11 is stirred in 35 parts of water and dissolved by the addition of a solution of 0.2 part of sodium hydroxide in 5 parts of water. The hydrochloride is precipitated in finely divided form by running in 2.46 parts of 37% hydrochloric acid. After lowering the temperature of the slurry to 5° C., diazotization is accomplished by adding slowly 0.35 part of sodium nitrite dissolved in 5 parts of water. An apple-green slurry results. 3.2 parts of 5,5'-dihydroxy-2,2'-dinaphthylamine-7,7'-disulfonic acid (41.7%) are dissolved in 40 parts of water containing 2.7 parts of sodium carbonate, the temperature of the solution is adjusted to about 5° C. and the diazo slurry poured in while agitating efficiently. Coupling is complete within one-half hour, yielding a deep blue solution. The temperature is then raised to 80° C. and 30.0 parts of sodium chloride added. After lowering the temperature to 20° C., the precipitated dyestuff is collected on the filter and is dried at 55° C. The dark powder resulting readily dissolved in water yielding a deep blue solution of reddish shade.

*Example 13*

0.5 part of the dyestuff as obtained in Example 12 is dissolved in 500 parts of water. 50 parts of this solution are diluted with 250 parts of water and then 3.5 parts of 10% Glauber's salt and 1.0 part of 10% sulfuric acid are added. Five parts of woolen flannel are well boiled out in 1% soap solution, rinsed in fresh water and entered into this dye bath. The temperature is raised to the boil and maintained thus for one hour while the woolen piece goods is well agitated. After removal from the dye bath, the wool is rinsed in hot water, soaped at 65° C., rinsed again and finally dried. It is levelly dyed a royal blue of distinctive brightness.

*Example 14*

50.0 parts of the standard dye solution prepared in Example 13 are diluted with 150 parts of water and 15 parts of 10% sodium chloride solution are added. The temperature of this dye bath is adjusted at 50° C. and 5 parts of bleached cotton piece goods previously wet out in 1% soap solution is entered and is efficiently agitated. The temperature is raised to the boil, maintained thus for one hour and the cotton piece goods is removed. It is rinsed, treated at 65° C. in 1% soap solution, again rinsed and dried. An extremely bright blue dyeing of marked greenish shade resulted.

*Example 15*

Dyestuffs of distinctive colors valuable because of brightness and general fastness properties are obtained by diazotization of the bases of the present invention and coupling of the resulting diazo compounds with a variety of coupling components. The following list illustrates some of the dyestuffs obtainable and the shades produced from their application:

| Dyestuffs | | Color of dye | Acid wool dyeing | Direct cotton dyeing |
|---|---|---|---|---|
| N-(2'-sulfo-4'-amino-phenyl)-6-amino-1,3-benzodioxan | → 2-hydroxy naphthalene-3,6-disulfonic acid. | Purple | Corinth | |
| N-(2'-sulfo-4'-amino-phenyl)-6-amino-1,3-benzodioxan | → 2-amino-5-hydroxy-naphthalene-7-sulfonic acid. | Red-blue | Maroon | |
| N-(2'-sulfo-4'-amino-phenyl)-6-amino-1,3-benzodioxan | → 5,5'-dihydroxy-2,2'-dinaphthylurea-7,7'-disulfonic acid. | Royal blue | Navy blue | Navy blue. |
| N-(2'-sulfo-4'-amino-phenyl)-6-amino-1,3-benzodioxan | → 1-(4'-sulfophenyl)-3-methylpyrazolone-5. | Brown-red | Red | |

| Dyestuffs | | | Color of dye | Acid wool dyeing | Direct cotton dyeing |
|---|---|---|---|---|---|
| N-(2'-sulfo-4'-amino-phenyl)-6-amino-1,3-benzodioxan | I (acid) ⟶ | 1-amino-8-hydroxy-naphthalene-3,6-disulfonic acid ↑ II | Purple | Black | |
| N-(2'-sulfo-4'-amino-phenyl)-6-amino-1,3-benzodioxan | ⟶ | aniline (alkaline). 2-hydroxy benzoic acid | Light brown | Khaki (top chromed) | |
| N-(2'-sulfo-4'-amino-phenyl)-6-amino-1,3-benzodioxan | ⟶ | Aceto acetanilide | Orange | Golden orange | |
| N-(2'-sulfo-4'-amino-phenyl)-6-amino-1,3-benzodioxan (neutral) | I ⟶ | 1,3-dihydroxy benzene II | Brown | Golden brown | |
| N-(2'-sulfondiethyl-amide-4'-aminophenyl)-6-amino-1,3-benzodioxan | ⟶ | sulfanilic acid (alkaline). 2-hydroxy naphthalene-3,6-disulfonic acid. | Violet | Purple | |
| N-(2'-sulfonamide-4'-aminophenyl)-6-amino-1,3-benzodioxan | ⟶ | 5,5'-dihydroxy-2, 2'-dinaphthylurea-7,7'-disulfonic acid. | Corinth | | Purple. |
| N-(2'-benzoyl-4'-amino-phenyl)-6-amino-1,3-benzodioxan | ⟶ | 5,5'-dihydroxy-2,2'-dinaphthylamine-7,7'-disulfonic acid. | Red-blue | | Navy blue. |
| N-(2'-sulfo-4'-amino-phenyl)-6-amino-1,3-benzodioxan | ⟶ | 1-naphthylamine ↓ (diazotized) 1-naphthylamine-7-sulfonic acid ↓ (diazotized) N-phenyl-N-5-hydroxy-2-naphthylamine-7-sulfonic acid. | Black | | Green-blue. |

We claim:
1. Chemical compounds selected from the group consisting of compounds represented by the formula

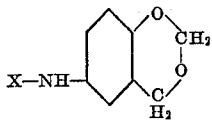

in which X represents a mononuclear para-aminophenyl radical, and the salts of said compounds.
2. A chemical compound according to claim 1 in which X represents a 2'-substituted-4'-aminophenyl radical, the 2'-substituent being a sulfonic radical.
3. A chemical compound according to claim 1 in which X represents a 2'-substituted-4'-aminophenyl radical, the 2'-substituent being a sulfonamide radical.
4. A chemical compound according to claim 1 in which X represents a 2'-substituted-4'-aminophenyl radical, the 2'-substituent being sulfonmorpholide.
5. A chemical compound according to claim 1 in which X represents a 2'-substituted-4'-aminophenyl radical, the 2'-substituent being the benzoyl radical.

HANS Z. LECHER.
JOHN P. GOULDING.
ROBERT P. PARKER.